US012065348B1

(12) United States Patent
Whitney

(10) Patent No.: US 12,065,348 B1
(45) Date of Patent: Aug. 20, 2024

(54) CAN OPENER WITH TOOLLESS REPLACEABLE COMPONENT DESIGN

(71) Applicant: Edlund Company, LLC, Burlington, VT (US)

(72) Inventor: Ryan S. Whitney, Essex Junction, VT (US)

(73) Assignee: Edlund Company, LLC, Burlington, VT (US)

( * ) Notice: Subject to any disclaimer, the term of this patent is extended or adjusted under 35 U.S.C. 154(b) by 453 days.

(21) Appl. No.: 17/450,926

(22) Filed: Oct. 14, 2021

Related U.S. Application Data

(60) Provisional application No. 63/198,627, filed on Oct. 30, 2020.

(51) Int. Cl.
*B67B 7/46* (2006.01)
*B67B 7/70* (2006.01)

(52) U.S. Cl.
CPC .......... *B67B 7/32* (2013.01); *B67B 2007/303* (2013.01)

(58) Field of Classification Search
CPC ........ B67B 7/32; B67B 7/30; B67B 2007/303
USPC ......... 30/417, 400, 412, 413, 416, 429, 433, 30/434, 443, 444, 445, 446, 450
See application file for complete search history.

(56) References Cited

U.S. PATENT DOCUMENTS 1,713,823 A * 5/1929 Edlund ..................... B67B 7/36 30/416
2,675,610 A * 4/1954 Walter ...................... B67B 7/36 30/416
3,439,418 A * 4/1969 Myers ....................... B67B 7/32 30/420
4,689,886 A * 9/1987 Bernazzani ............... B67B 7/32 30/433
5,052,110 A * 10/1991 Bartlett ..................... B67B 7/30 30/448
6,249,980 B1 * 6/2001 Edwards ................... B67B 7/32 30/434

OTHER PUBLICATIONS

Edlund, S-11 NSF Manual Can Openers. https://www.edlundco.com/products/s-11-manual-can-openers/ (Last downloaded on Oct. 11, 2021).
Edlund, U-12 NSF Manual Can Openers. https://www.edlundco.com/products/u-series-manual-can-opener/ (Last downloaded on Oct. 11, 2021).
Edlund, New! SG-2 NSF Stainless Manual Can Openers. https://www.edlundco.com/products/sg-2-nsf-stainless-steel-manual-can-opener/ (Last downloaded on Oct. 11, 2021).
Edlund, G-2 Series NSF Manual Can Opener. https://www.edlundco.com/products/g-series-manual-can-openers/ (Last downloaded on Oct. 11, 2021).

* cited by examiner

*Primary Examiner* — Phong H Nguyen
(74) *Attorney, Agent, or Firm* — Downs Rachlin Martin PLLC

(57) ABSTRACT

Manual can openers that include longer-lasting knife designs, knife holders that securely hold a knife as well as a securing mechanism that provides for fast and easy knife replacement, and a toolless design that includes a dual purpose pull pin configured for use as both a pin for a knife hinge as well as a drive gear lock for disassembling a drive assembly of the can opener.

10 Claims, 7 Drawing Sheets

CAN OPENER WITH TOOLLESS REPLACEABLE COMPONENT DESIGN

RELATED APPLICATION DATA

This application claims the benefit of priority of U.S. Provisional Patent Application Ser. No. 63/198,627, filed Oct. 30, 2020, and titled Can Opener With Toolless Replaceable Component Design, which is incorporated by reference herein in its entirety.

FIELD OF THE DISCLOSURE

The present disclosure generally relates to the field of manual can openers. In particular, the present disclosure is directed to manual can openers with toolless replaceable component designs.

BACKGROUND

The Edlund Company has been manufacturing and selling a series of industrial manual can openers for use in commercial kitchens for decades, including the #1® and #2®, known in the industry as the Old Reliables®, the S-11, the Universal Series, the SG-2, and the G Series. These time tested designs are known for their versatility, durability, and reliability.

SUMMARY OF THE DISCLOSURE

In one implementation, the present disclosure is directed to a knife for a manual can opener. The knife includes a first and second opposed sides, a longitudinal axis, first and second ends, and at least four blades that include a first pair of blades located at the first end and a second pair of blades located at the second end.

In another implementation, the present disclosure is directed to a knife assembly. The knife assembly includes the knife of claim 1; and a knife hinge that includes a first portion configured to be rotatably coupled to a housing of the can opener for rotating between a can opening position and a can piercing position; and a knife holder that defines a recess having a complementary shape to the first and second ends of the knife, wherein the knife is configured to be removeably disposed in the recess.

In yet another implementation, the present disclosure is directed to a manual can opener. The manual can opener includes a housing; a drive gear having first and second opposed sides, a recess in at least one of the first and second opposed sides, and a plurality of gear teeth, the gear rotatably disposed in the housing and configured to engage a side of a can being opened to rotate the can; a handle; and an arbor coupled to the handle and threadably coupled to the gear, the arbor configured to transmit a user-generated force from the handle to the gear to rotate the gear; wherein the recess is configured and dimensioned to receive an elongate locking member removeably disposed in the recess, the locking member configured to prevent rotation of the drive gear when the locking member is disposed in the recess for unthreading the arbor from the gear.

In yet another implementation, the present disclosure is directed to a method of using a manual can opener that includes an arbor and a drive gear threadably coupled to the arbor, the drive gear having first and second opposed sides, a recess in at least one of the sides, and a plurality of teeth that engage an outer wall of a can to thereby rotate the can. The method includes removably disposing an elongate locking member in the recess; rotating the arbor in a first direction to rotate the drive gear until the elongate locking member engages the housing, thereby preventing further rotation of the drive gear in the first direction; continuing to rotate the arbor to unthread the arbor from the drive gear; and removing the gear from the can opener.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Figure 1:
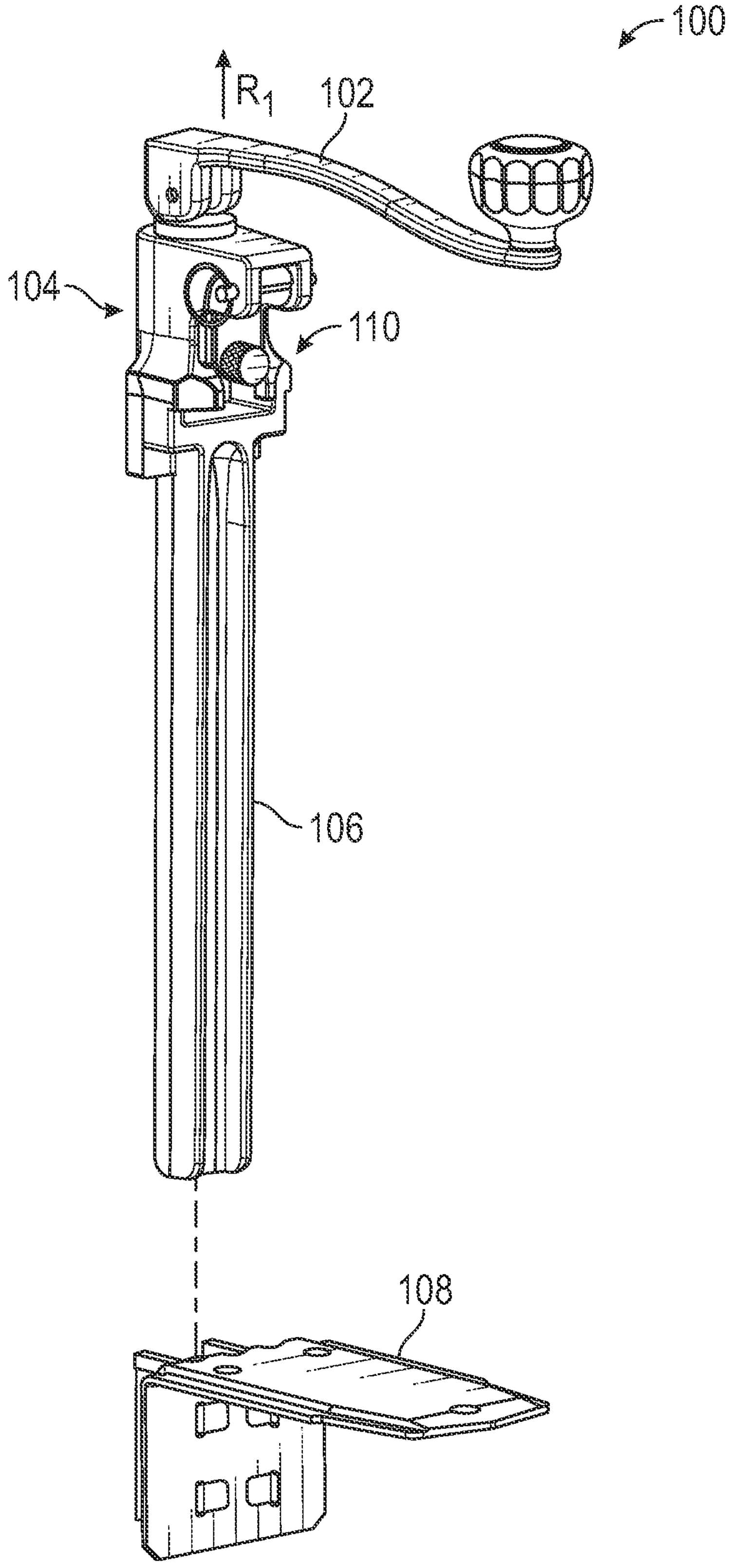
FIG. 1 is a perspective view of a manual can opener positioned above a base.

The present disclosure includes manual can openers that incorporate improvements as compared to existing Edlund® manual can openers, including improved knife designs, improved knife holder designs, and the incorporation of features that allow for easy component replacement and cleaning without the need for tools, also referred to herein as a toolless design. The accompanying figures illustrate one example implementation of a manual can opener made in accordance with the present disclosure. FIG. 1 illustrates one example implementation in which a can opener 100 includes a handle 102 operatively coupled to a unitary housing 104 and slide bar 106 that is configured to be slidably disposed in a base 108 that is configured to be secured to a horizontal surface (not illustrated), such as a countertop. The handle 102 is operatively coupled to a knife 110 and configured to move the knife between a can piercing position when the handle is in a vertical position as show in in FIGS. 10 and 11 and a can opening position when the handle is in a horizontal position as shown in FIG. 1. The handle 102 is also operably coupled to a drive gear 202 (see, e.g., FIG. 2) such that the drive gear rotates when the handle is rotated about an axis of rotation, R1.

During use, to initially couple the can opener 100 to a can (not illustrated) to open the can, the handle 102 is moved to the vertical position and the can opener is raised up with the slide bar 106 sliding within and moving relative to the base 108. A can to be opened is placed on the base 108 and the can opener 100 is then lowered until the knife 110 pierces the top of the can. The handle 102 is then moved to the horizontal position, thereby causing the knife 110 to move from the can piercing position to the can opening position. The handle 102 can then be rotated by a user about the axis of rotation, R, the user-generated force being transmitted from the handle through the can opener to the drive gear 202, thereby causing the drive gear to rotate, which drives the can in a rotating motion, causing the knife 110 to shear open the top of the metal can as the metal can rotates relative to the knife.

Figure 2:
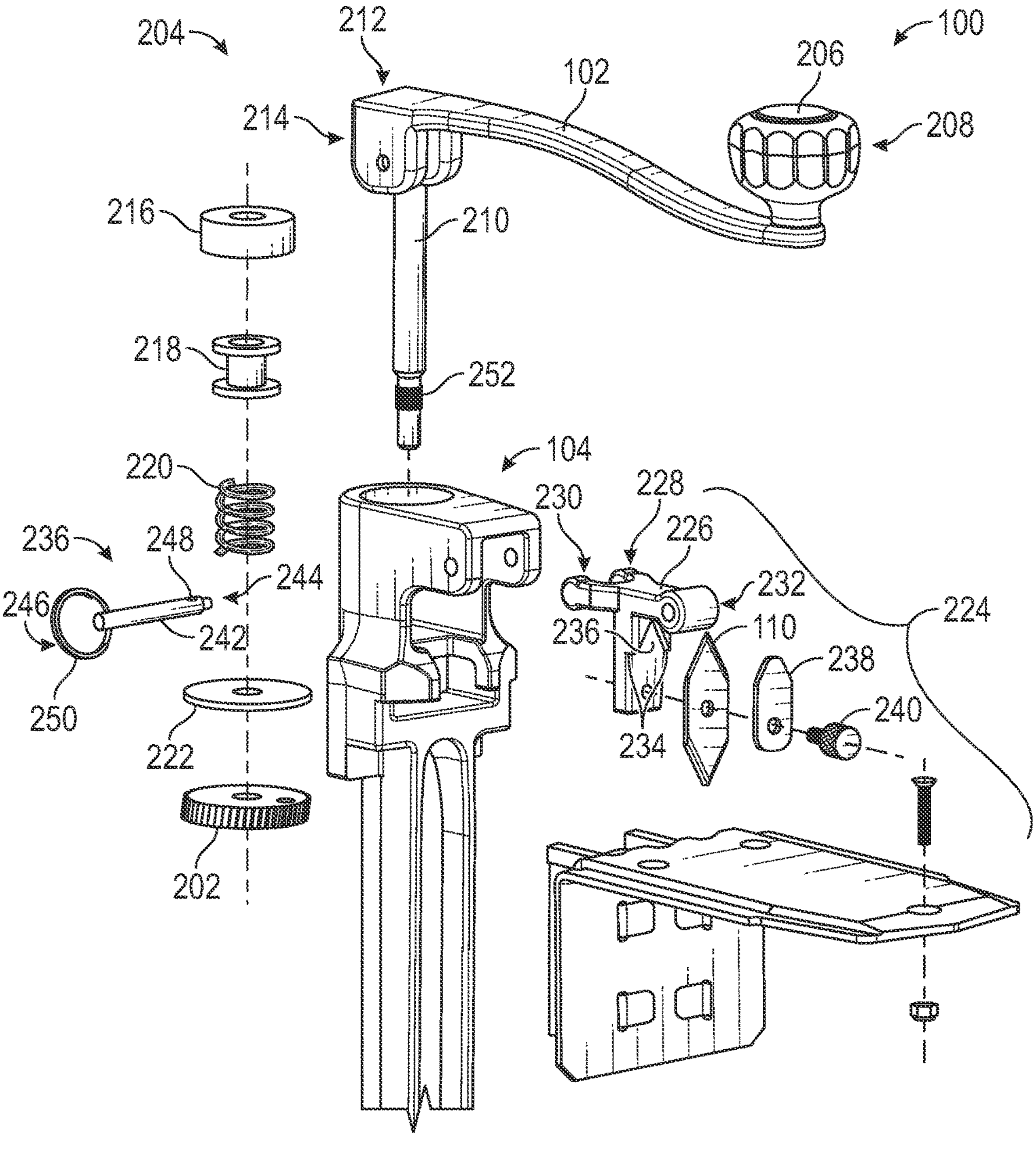
FIG. 2 is an exploded view of the can opener of FIG. 1.
Figure 3A:
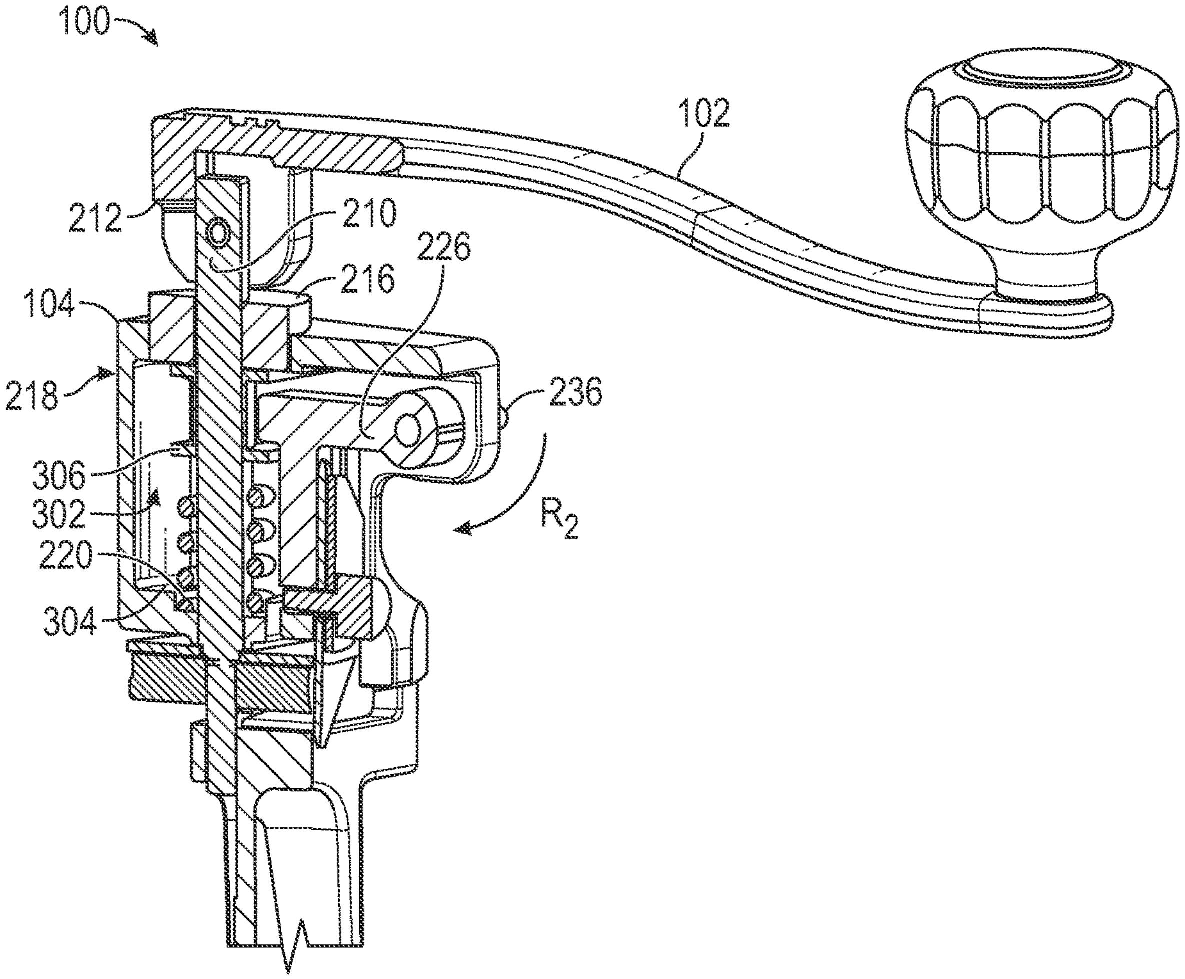
FIG. 3A is a perspective cross-sectional side view of a portion of the can opener of FIG. 1 showing the handle in a horizontal position and the knife in a can opening position.
Figure 3B:
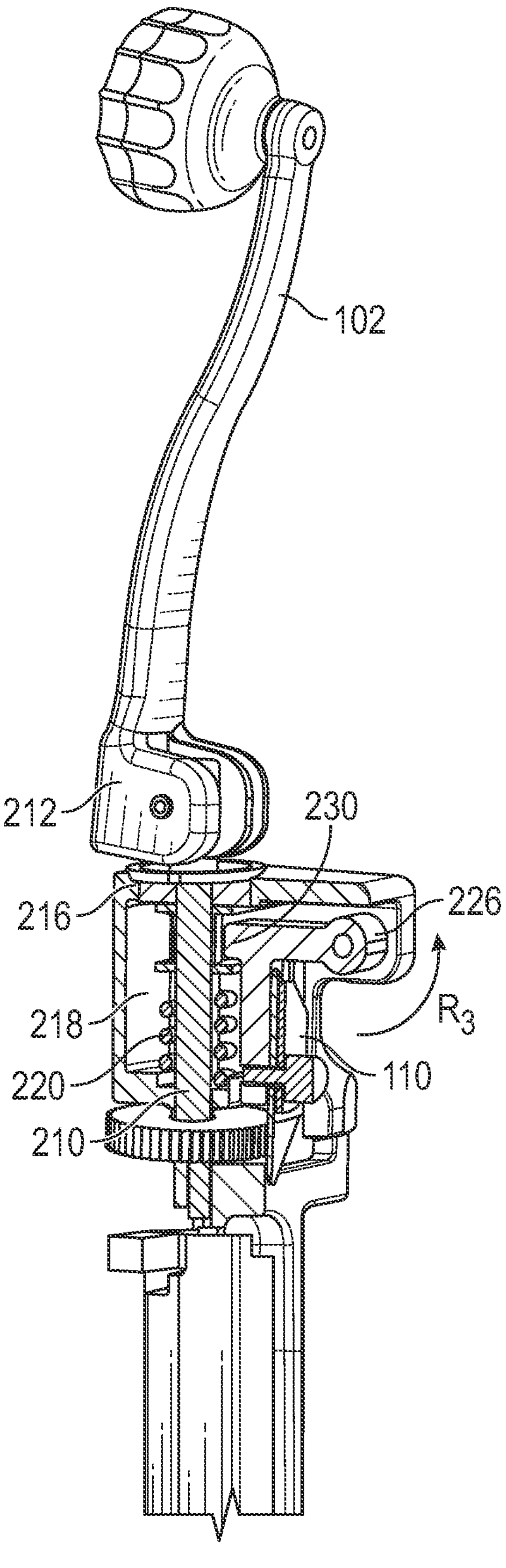
FIG. 3B is a perspective cross-sectional side view of a portion of the can opener of FIG. 1 showing the handle in a vertical position and the knife in a can piercing position.

FIG. 2 is an exploded view of the manual can opener 100 illustrating the main components of the assembly and FIG. 3 is a cross sectional perspective view showing how the components are assembled. As shown in FIGS. 2, 3A, and 3B, the can opener 100 includes a drive assembly 204 that includes the handle 102, a knob 206 rotatably attached to a first end 208 of the handle and an arbor 210 pivotally attached to a second end 212 of the handle by a pivot coupling 214, the pivot coupling allowing the handle to move between the horizontal and vertical positions. The arbor 210 is slidably disposed through a bushing 216, a spool 218, a compression spring 220, and a washer 222 and then threadably coupled to the drive gear 202.

Figure 4:
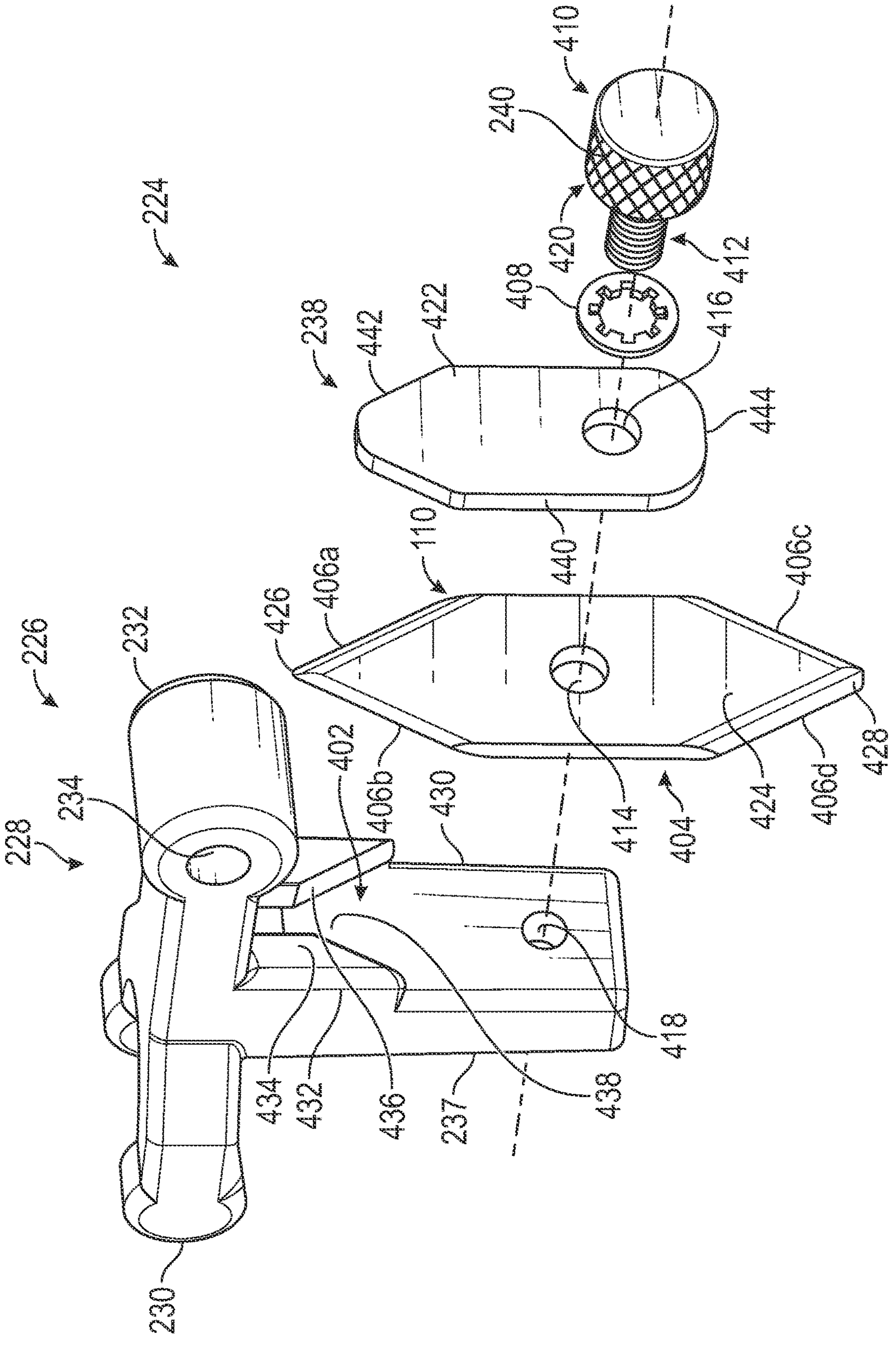
FIG. 4 is an exploded view of the knife assembly of the can opener of FIG. 1.

Referring to FIGS. 2 and 4, the can opener 100 also includes a knife assembly 224 that includes a unitary knife hinge 226 that includes a first portion 228 having a yoke-shaped first end 230 and a second end 232, the first end configured and dimensioned to engage the spool 218 and the second end including an opening 234 configured to receive a pull pin 236 to pivotally couple the second end 232 to the housing 104. The knife hinge 226 also includes a knife holder 237 that extends perpendicularly from the first portion 228 and that includes a recess 402 that has a complementary shape to an outer shape of a four-bladed knife 110 for securely holding the knife in the knife holder 237. The knife assembly 224 also includes a plate 238 and a fastener 240 for securing the knife 110 to the knife holder 237 in the knife holder recess 402.

As best seen in FIG. 3A, the housing 104 includes a cavity 302 that the arbor 210, spool 218, and spring 220 are disposed in. The spring 220 is a compression spring designed to exert an extension force on a floor 304 of the cavity 302 and a bottom flange 306 of the spool 218. The spring 220, therefore, applies a vertical force on the spool 218, thereby pressing the spool against the bushing 216. The vertical movement of the spool 218 caused by the spring 220 also results in a vertical movement of the yoke-shaped first end 230 of the knife hinge 226, resulting in a rotation of the knife hinge about the pull pin 236 in an inward direction as indicated by the arrow R2 in FIG. 3A causing the knife 110 to move to the can opening position shown in FIG. 3A. The rotational movement of the knife hinge 226 results in an inward movement of the knife 110 towards the drive gear 202, resulting in the inner side 404 (FIG. 4) of the knife being pressed against the drive gear that engages the teeth of the drive gear against the outer wall of a can which enables the drive gear to rotationally drive the can to perform the opening operation. Thus, the net result is the vertical force exerted by the spring 220 is translated into a rotational force by the spool 218 and knife hinge 226, thereby resulting in the knife 110 when pierced through a can top and inserted into the can, pressing a can against the drive gear 202.

FIG. 3B is another cross sectional perspective view of the can opener 100 showing the handle 102 in the vertical position. When the handle 102 is moved from the horizontal position to the vertical position, the second end 212 of the handle presses the bushing 216 down the arbor 210, which causes the spool 218 to move down the arbor and the compression spring 220 to compress. The downward movement of the spool 218 causes the first end 230 of the knife hinge 226 to also move down, resulting in a rotational movement of the knife hinge in an outward direction as indicated by the arrow R3 in FIG. 3B and the knife 110 moving from the can opening position shown in FIG. 3A to the can piercing position shown in FIG. 3B.

FIG. 4 shows an exploded view of the knife assembly 224. As shown, the knife 110 has four blades **406*a*-406*d* which significantly increases the number of times the knife can be used before needing to be replaced as compared to prior art manual can opener knives which may only have one or two blades on only one end of the knife. The knife is removably secured to the knife holder by the clamping plate 238, a lock washer 408, and the fastener 240. In the illustrated example the fastener 240 is a screw having a knurled end 410 and a threaded shaft 412. The threaded shaft 412 of the fastener 240 is configured to be slidably disposed through an opening 414 in the knife 110 and an opening 416 the clamping plate 238 and threadably coupled to mating threads located in an opening 418 in a lower portion of the knife holder 237. A base 420 of the knurled end 410 is configured to press against a first side 422 of the clamping plate 238 and apply a compressive force to the clamping plate and knife 110 to securely hold the knife against the knife holder 237. In the illustrated example, the knife 110 has a diamond shape and the opening 414 is located in a center of the knife at a midpoint of a central longitudinal axis of the knife. The knife 110 has first 424 and second 404 opposed sides and first 426 and second 428 ends, with two opposing blades 406 on each end. In the illustrated example, blades 406*a* and 406*b* define an acute angle and converge at first end 426 and blades 406*c* and 406*d* similarly define an acute angle and converge at second end 428. During use, only one of the blades 406 is positioned in an active blade location and used at a time. After one of the blades 406 becomes worn the knife 110 can be repositioned on the knife holder 237 so another one of the blades will be positioned in the active blade location for use. For example, if the knife 110 is oriented as shown in FIG. 4 with the second side 404 in contact with the knife holder 237, a second one of the blades 406 can be positioned in a cutting position by removing the fastener 240 and rotating the knife about its central longitudinal axis and repositioning the knife in the knife recess 402 with the first side 424 in contact with the knife holder. After the second blade 406 has become worn, the knife can be rotated so that the second end 428 is disposed in the knife recess 402 and then when the third blade 406 is worn, the knife 110 rotated about its longitudinal axis again to use the fourth and final blade 406. After all four blades 406 are worn, the knife 110** can be replaced with a new four-bladed knife.

In the illustrated example, the knife recess 402, knife 110, and clamping plate 238 have complementary shapes to provide a stable and secure connection of the knife to the knife holder, despite utilizing only one fastener 240 to secure the knife to the knife holder. By having only one fastener 240 in the form of a thumb screw, the knife 110 can be quickly and easily repositioned to use a new blade 406 or replaced when all four blades have been consumed. The knife holder 237 includes a planar recessed base 430 designed to mate with the first side 424 or second side 404 of the knife 110 and provide a flat and stable surface. A top portion of the knife holder 237 includes two blade-engaging protrusions 432 (only one labeled) that each include a first surface 434 that is parallel to the base 430 and a second surface 436 that is perpendicular to the base and disposed at an acute angle with respect to a central longitudinal axis of the knife holder and that is substantially the same as an angle of the blades 406 on the knife. The second surfaces 436 of the blade-engaging protrusions 432 are configured and dimensioned to form a recess 438 that has a complementary shape to the knife 110 and cooperates with the fastener 240 to securely couple the knife to the knife holder 237 to prevent a rotational movement of the knife.

Figure 5:
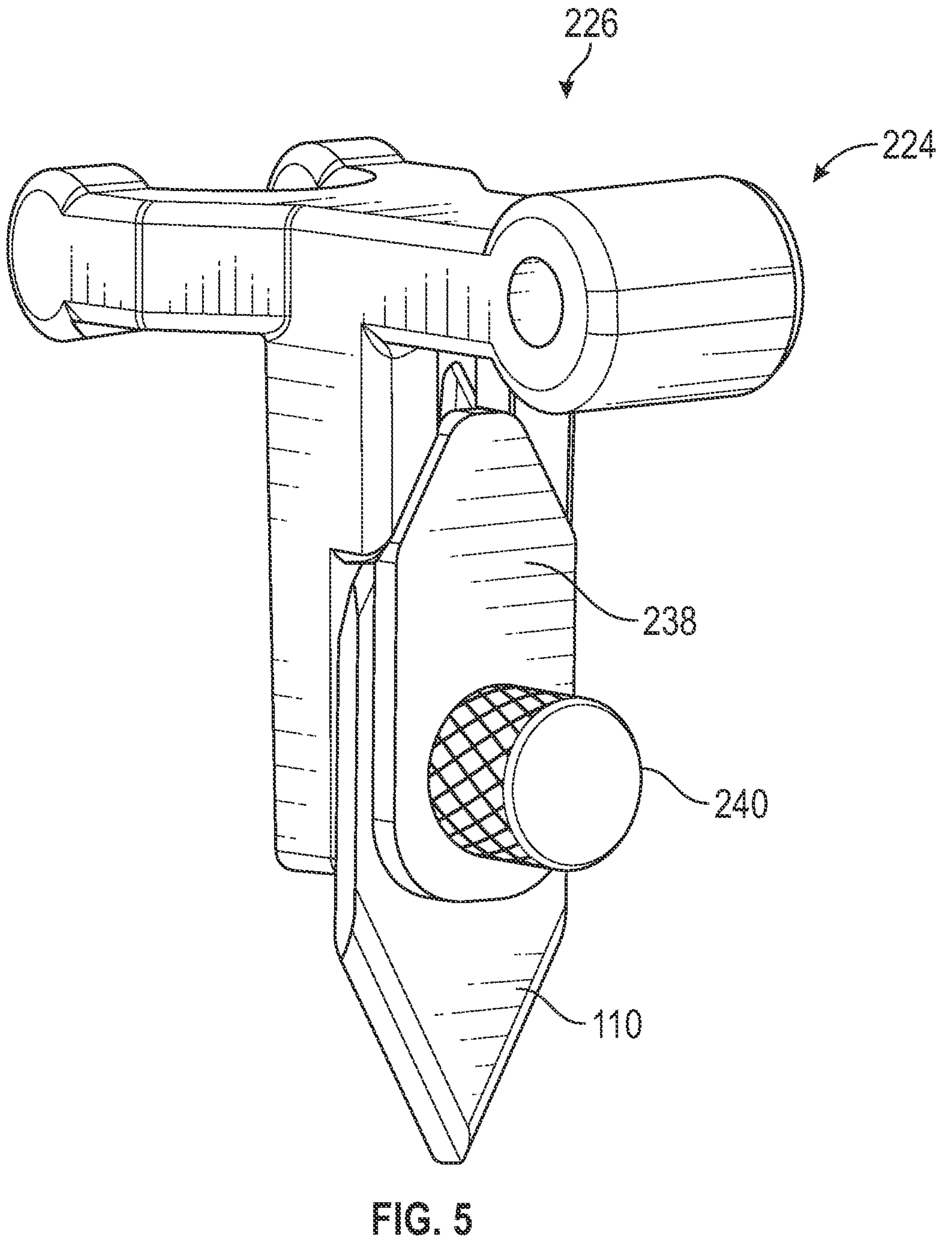
FIG. 5 is a perspective view of the knife assembly of the can opener of FIG. 1 in an assemble configuration.

The opening 416 in the clamping plate 238 extends from the first side 422 to an opposing second side 440 and has a first end 442 and a second end 444. The opening 416 is located in a lower portion of the clamping plate proximate the second end 444 so that when positioned on the knife 110 the second end 444 is located above the blades 406 of the knife so that it does not interfere with a cutting operation being performed by the knife. The first end 442 of the clamping plate 238 has a triangular or trapezoidal cross-sectional shape that is complementary to the shape defined by the blade-engaging protrusions 432 of the knife holder 237 and are disposed at an acute angle to a central longitudinal axis of the clamping plate 238 that is substantially the same as an angle of the blades 406 relative to a central longitudinal axis of the knife 110. In one illustrated example, when assembled the first side 422 of the clamping plate 238 is substantially flush with the first surfaces 434 of the blade-engaging protrusions 432. In another example, the first side 422 of the clamping plate 238 may stand proud of the blade-engaging protrusions 432. In one example, a height of the blade-engaging protrusions 432 is substantially the same as the sum of the thickness of the knife 110 and a thickness of the clamping plate 238. In another example, a height of the blade-engaging protrusions 432 is approximately equal to the sum of the thickness of the knife 110 and half of the thickness of the clamping plate 238. FIG. 5 illustrates the knife assembly 224 in assembled form.

Figure 6:
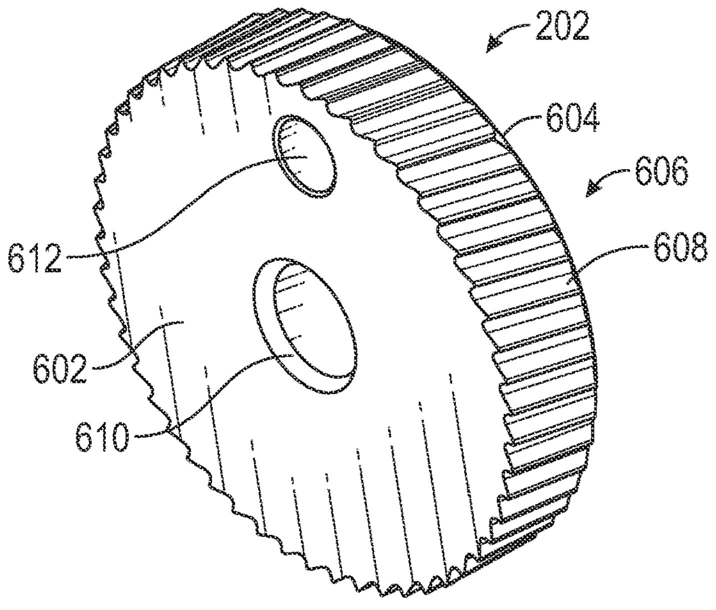
FIG. 6 is a bottom perspective view of the drive gear of the can opener of FIG. 1 showing the pull pin gear lock recess.
Figure 7:
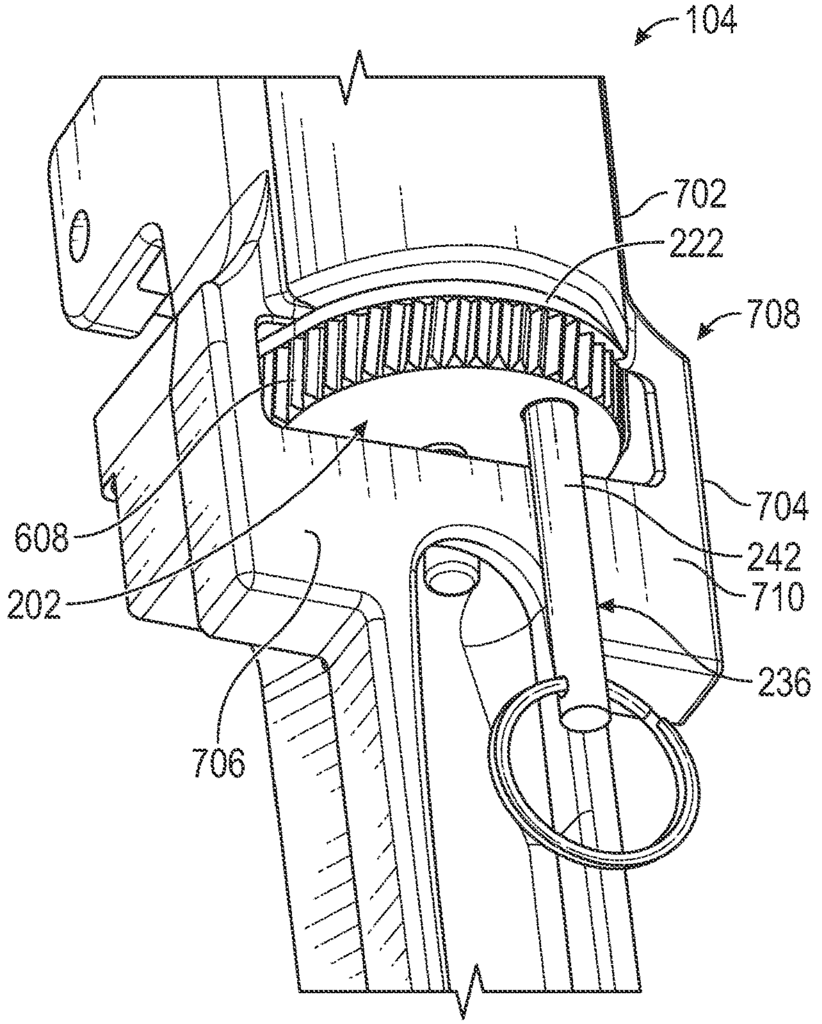
FIG. 7 is a rear perspective view of the can opener of FIG. 1 showing the pull pin disposed in the pull pin gear lock recess and in use as a drive gear lock for dissembling the drive gear from the arbor.

FIG. 6 is a top perspective view of the drive gear 202. As shown, the drive gear 202 has an annular shape and includes opposing top 602 and bottom 604 sides, an outer diameter 606 that includes a plurality of drive gear teeth 608 for engaging an outer wall of a can, and an inner diameter defined by an inner wall 610 that includes threads (not illustrated) for threadably engaging the threaded end 252 of the arbor 210 (FIG. 2). The drive gear 202 also includes a pull pin recess 612 that extends from the top 602 to bottom 604 surfaces and that is configured and dimensioned to receive the pull pin 236 as shown in FIG. 7. As shown in FIG. 7, the housing 104 includes an upper portion 702 that has a curved surface that is configured and dimensioned to have a radius that is approximately the same as the drive gear 202 and be approximately aligned with the outer diameter 606 of the drive gear 202 when the drive gear is installed in the housing. A lower portion 704 of the housing includes a planar surface 706 that includes a drive gear opening 708, the planar surface recessed with respect to the drive gear teeth 608, resulting in a portion of the bottom side 604 of the drive gear being exposed.

During the lifetime of the can opener 100, a user may need to disassemble the can opener for any number of reasons, such as to inspect the components of the can opener, replace one or more components, and/or dislodge foreign objects located within the can opener. One reason to dissemble the can opener 100 is to replace the drive gear 202. Over time, the teeth 608 of the drive gear can become worn, decreasing the effectiveness of the can opener. In a busy kitchen, it can be desirable to be able to quickly and easily disassemble the can opener, for example, to replace worn components, without needing to locate and use tools to perform the disassembly. As described herein, can openers disclosed herein, such as can opener 100 can have a toolless design, where the can opener can be dissembled and one or more components replaced, such as one or more consumable components, such as drive gear 202 and knife 110 without the use of tools. Instead, all equipment or other features required to dissemble the can opener can be located on the can opener itself. In some examples, any component used in the disassembly process has at least one additional function in addition to the disassembly function it is designed and configured to perform, while in other examples, the disassembly function(s) provided by one or more components used in the disassembly process is/are the primary function of those particular components.

As shown in FIG. 7, in the illustrated example, the pull pin 236 that is used to pivotally couple the knife hinge 226 to the housing 104 has a dual purpose and can also be used as a drive gear lock to unthread the drive gear 202 from the arbor 210 and detach the drive gear from the arbor. The pull pin 236 is an example of an elongate locking member that can be removably disposed in recess 612 to prevent rotation of the drive gear 202 to facilitate unthreading the drive gear from the arbor 210. In other examples, an elongate member other than pull pin 236 may be used to lock the drive gear in place. In the illustrated example, recess 612 and pull pin 236 both have a circular cross sectional shape. In other examples, any other cross sectional shape may be used for one or both of the recess 612 and pull pin 236 or other elongate locking member, such as an oval shape or any polygon shape, e.g., square, star key, also referred to as a Torx® key, etc.

The handle 102 can be rotated to rotate the drive gear 202 until the pull pin recess 612 in the drive gear is exposed on the back side of the can opener and the pull pin 236 can be removed from knife hinge 226 and inserted into the pull pin recess 612 resulting in the configuration shown in FIG. 7. In the illustrated example, the pull pin recess 612 is a through hole that extends through the drive gear. In other examples, the pull pin recess 612 may be a blind hole that does not extend through an entire thickness of the drive gear. Referring briefly to FIG. 2, in the illustrated example, the pull pin 236 includes a pin shaft 242 having first 244 and second 246 ends, and a detent in the form of a spring loaded ball 248 disposed in the first end and a ring 250, such as a solid ring, cotter ring, or split ring, coupled to the second end 246. Referring back to FIGS. 6 and 7, the pull pin recess 612 has a diameter that is approximately the same as a diameter of the pull pin shaft 242 and that is sized for a slight interference fit with the first end 244 of the pull pin such that the spring loaded ball 248. The spring loaded ball 248 is configured to engage an inner wall of the pull pin recess 612 and hold the pull pin 236 in place in the recess when the can opener is in a vertical orientation as shown in FIG. 7. The pull pin 236 can be inserted into the pull pin recess 612 until the first end 244 of the pull pin comes into contact with the washer 222 adjacent the drive gear 202. After inserting the pull pin 236, the handle 102 can be rotated in an opposite direction from a normal can opening operation, here counter clockwise, until the pull pin 236 makes contact with a pin-engaging surface 710 defined by the planar surface 706 of the lower portion 704 of the housing 104. The drive gear 202 is then held in a fixed position by the pull pin 236 and pin-engaging surface 710 of the housing while the arbor 210 continues to rotate, the arbor then beginning to rotate relative to the drive gear, thereby unthreading the arbor from the drive gear. The handle 102 can continue to be rotated until the arbor is fully unthreaded from the drive gear. The illustrated can opener 100, therefore, has a toolless design where the entire can opener can be quickly and easily disassembled without the use of any tools.

A method of disassembling a drive assembly of a can opener, such as the drive assembly 204 of can opener 100, and replacing an existing drive gear, such as drive gear 202 with a new drive gear may include a first step of removing the pull pin 236 from the housing 104 and a second step of removing the knife assembly 224 from the housing 104. In some examples the second step may be optional and the knife assembly may remain in the housing while the drive gear is being replaced. In some examples, the first step is also optional and a separate pin or other elongate locking member can be used to hold the drive gear in place to allow the arbor 210 to be unthreaded or otherwise decoupled from the drive gear. The method may also include a third step (which may be performed before or after the first and second steps) of rotating the handle 102 to thereby rotate the gear 202 until the pull pin recess 612 is exposed; a fourth step of using the pull pin 236 as a drive gear lock by inserting the pull pin in the pull pin recess 612 on the bottom side 604 of the gear; a fifth step of rotating the handle 102 until the pull pin 236 makes contact with the housing 104, such as pin-engaging surface 710 on lower portion 704 of the housing; a sixth step of continuing to rotate the handle while the gear remains fixed in place by the pull pin and housing, thereby unthreading the arbor from the gear; a seventh step of removing the handle and arbor; an eighth step of removing the drive gear and any remaining drive assembly components from the housing; and a ninth step of reassembling the drive assembly with a replacement drive gear.

Aspects of the present disclosure also include a kit of replacement parts for replacing one or more components of a manual can opener, wherein the kit may include one or more of a knife, such as knife 110, a plate such as plate 238, a fastener, such as fastener 240, a knife hinge, such as knife hinge 226, a drive gear, such as drive gear 202, a washer, such as washer 222, and a pull pin, such as pull pin 236.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

What is claimed is:

1. A manual can opener, comprising:

a housing;

a drive gear having first and second opposed sides, a recess in at least one of the first and second opposed sides, and a plurality of gear teeth, the gear rotatably disposed in the housing and configured to engage a side of a can being opened to rotate the can;

a handle; and an arbor coupled to the handle and threadably coupled to the gear, the arbor configured to transmit a user-generated force from the handle to the gear to rotate the gear;

wherein the recess is configured and dimensioned to receive an elongate locking member removeably disposed in the recess, the locking member configured to prevent rotation of the drive gear when the locking member is disposed in the recess for unthreading the arbor from the gear.

2. The manual can opener of claim 1, wherein the recess is a through hole that extends through an entire thickness of the drive gear from the first side to the second side of the drive gear.

3. The manual can opener of claim 1, wherein the housing includes a drive gear opening and a lower portion below the drive gear opening, the lower portion defining a surface that is recessed with respect to an outer extent of the drive gear, wherein the locking member is configured to engage the surface of the lower portion when the locking member is disposed in the recess of the drive gear to prevent rotation of the drive gear in at least one direction relative to the housing.

4. The manual can opener of claim 1, further comprising a knife assembly that includes a knife removably coupled to a knife hinge, wherein the knife hinge is rotatably coupled to the housing by the elongate locking member, the elongate locking member configured to be removed from the knife assembly and inserted in the recess of the gear for disassembly of the gear from the can opener.

5. The manual can opener of claim 4, wherein the elongate locking member is a pull pin that includes first and second ends, a pull ring coupled to the first end and a detent located in the second end.

6. The manual can opener of claim 1, wherein the elongate locking member has a circular, oval, or polygon cross sectional shape.

7. A method of using a manual can opener that includes an arbor and a drive gear threadably coupled to the arbor, the drive gear having first and second opposed sides, a recess in at least one of the sides, and a plurality of teeth that engage an outer wall of a can to thereby rotate the can, the method comprising:

removably disposing an elongate locking member in the recess;

rotating the arbor in a first direction to rotate the drive gear until the elongate locking member engages the housing, thereby preventing further rotation of the drive gear in the first direction;

continuing to rotate the arbor to unthread the arbor from the drive gear; and removing the gear from the can opener.

8. The method of claim 7, wherein the can opener includes a knife hinge rotatably coupled to the housing by the elongate locking member, the method further comprising:

removing the elongate locking member from the knife hinge prior to performing the removably disposing step.

9. The method of claim 7, wherein the can opener further includes a knife removably coupled to the knife hinge, the knife having first and second opposed sides, a longitudinal axis, first and second ends, and at least four blades that include a first pair of blades located at the first end and a second pair of blades located at the second end, the method further comprising:

sequentially positioning the knife in the knife hinge in four different orientations to selectively use each of the at least four blades.

10. The method of claim 9, wherein the sequential positioning includes rotating the blade about the longitudinal axis and rotating the blade about a second axis that is perpendicular to the longitudinal axis.

* * * * *